(12) United States Patent
Ishino et al.

(10) Patent No.: US 8,786,247 B2
(45) Date of Patent: Jul. 22, 2014

(54) CHARGING CIRCUIT

(75) Inventors: Tsutomu Ishino, Kyoto (JP); Tadayuki Sakamoto, Kyoto (JP)

(73) Assignee: Rohm Co., Ltd. (JP)

( * ) Notice: Subject to any disclaimer, the term of this patent is extended or adjusted under 35 U.S.C. 154(b) by 337 days.

(21) Appl. No.: 13/232,159

(22) Filed: Sep. 14, 2011

(65) Prior Publication Data

US 2012/0235623 A1 Sep. 20, 2012

(30) Foreign Application Priority Data

Sep. 17, 2010 (JP) ................................. 2010-209746

(51) Int. Cl.
| | |
|---|---|
| *H01M 10/44* | (2006.01) |
| *H02J 1/00* | (2006.01) |
| *H02J 7/00* | (2006.01) |
| *G05F 3/06* | (2006.01) |
| *G05F 1/00* | (2006.01) |

(52) U.S. Cl.
USPC ............... 320/101; 307/82; 307/66; 307/125; 307/151; 323/282; 323/284; 323/901

(58) Field of Classification Search
USPC ....................... 320/101; 307/82, 66, 125, 151; 323/282, 284, 901
See application file for complete search history.

(56) References Cited

U.S. PATENT DOCUMENTS

| | | | | |
|---|---|---|---|---|
| 6,122,212 | A * | 9/2000 | Bui et al. ....................... | 365/207 |
| 6,882,133 | B2 * | 4/2005 | Haraguchi et al. ............ | 323/284 |
| 7,132,835 | B1 * | 11/2006 | Arcus ........................... | 324/523 |
| 7,576,529 | B2 * | 8/2009 | Ishino ........................... | 323/284 |
| 7,868,598 | B2 * | 1/2011 | Ishino ........................... | 323/282 |
| 8,563,845 | B2 * | 10/2013 | Work et al. .................... | 136/244 |
| 2005/0093531 | A1 * | 5/2005 | Vorenkamp et al. .......... | 323/316 |
| 2007/0262825 | A1 * | 11/2007 | Kitamura et al. ............. | 331/185 |
| 2009/0160259 | A1 * | 6/2009 | Naiknaware et al. .......... | 307/82 |
| 2010/0270862 | A1 * | 10/2010 | Miyanaga et al. .............. | 307/66 |
| 2010/0295383 | A1 * | 11/2010 | Cummings .................... | 307/151 |

FOREIGN PATENT DOCUMENTS

| | | |
|---|---|---|
| JP | 60-80315 A | 5/1985 |
| JP | 7-83968 A | 3/1995 |
| JP | 7-336910 A | 12/1995 |
| JP | 8-186980 A | 7/1996 |
| JP | 2002-204570 A | 7/2002 |
| JP | 2005-328662 A | 11/2005 |
| JP | 2007-20316 A | 1/2007 |
| JP | 2007-135384 A | 5/2007 |
| JP | 2007-221893 A | 8/2007 |

OTHER PUBLICATIONS

Notification of Reasons for Refusal for Japanese Patent Application No. 2010-209746, dispatched Apr. 22, 2014, with English translation.

* cited by examiner

*Primary Examiner* — M'Baye Diao
(74) *Attorney, Agent, or Firm* — Cantor Colburn LLP

(57) ABSTRACT

A charging circuit receives electric power from a solar battery, and charges a secondary battery. A charging current detection unit generates a detection signal that corresponds to a charging current supplied from a DC/DC converter to the secondary battery. A control circuit generates a reference voltage that corresponds to the detection signal. A driving unit generates a pulse signal having a duty ratio that is adjusted such that the voltage output from the solar battery matches the reference voltage, and performs switching of a switching transistor according to the pulse signal. A control circuit adjusts the reference voltage such that the reference voltage becomes greater.

18 Claims, 9 Drawing Sheets

CHARGING CIRCUIT

BACKGROUND OF THE INVENTION

1. Field of the Invention

The present invention relates to a charging circuit configured to charge a secondary battery using electric power received from a solar battery.

2. Description of the Related Art

In recent years, electronic devices such as cellular phones, PDAs (Personal Digital Assistants), and laptop personal computers, mount a secondary battery. At present, such a secondary battery is charged using electric power received from an adapter configured to convert a commercial AC voltage into a DC voltage, or electric power received from a USB bus. In recent years, there have been efforts to provide an electronic device configured to mount a solar battery, and to charge such a secondary battery using electric power received from such a solar battery.

In a case in which such a solar battery to be used to charge such a secondary battery has a multi-cell structure in which multiple battery cells are stacked, e.g., a structure employing a stack of ten 0.5 V cells, if a part of the solar battery is blocked, the output voltage decreases. In some cases, this leads to a problem in that the charging circuit cannot operate normally. Furthermore, such a solar battery requires wiring space in order to connect the adjacent cells, leading to a problem of a reduced aperture ratio, and also to deterioration in its appearance.

In order to solve such problems, the number of cells for such a solar battery configured to charge such a secondary battery should be on the order of one or two. In a case in which such a solar battery has a single cell, the voltage supplied to the charging circuit is on the order of 0.5 V. In a case in which such a solar battery has two cells, the voltage supplied to the charging circuit is on the order of 1 V. Accordingly, in order to charge a lithium-ion battery (3 to 4.2 V), which is widely employed as a secondary battery, there is a need to boost the voltage received from the solar battery using a DC/DC converter before the voltage is supplied to the secondary battery.

FIG. 1 is a graph which shows the current-voltage (I-V) characteristics of a single-cell solar battery. The horizontal axis represents the voltage output from the solar battery, the left vertical axis represents the output current of the solar battery, and the right vertical axis represents the output electric power of the solar battery. When no load is applied to the solar battery, i.e., when the output current is zero, the output voltage of the solar battery reaches its maximum (open voltage), i.e., 0.6 V. As the output current is greater, the output voltage becomes smaller. Directing attention to the output electric power of the solar battery, the solar battery provides its maximum output electric power when the output voltage is set in the vicinity of 0.5 V. Using such electrical characteristics of the solar battery, a feedback control method has been proposed in which the output voltage of the solar battery, i.e., the input voltage of the DC/DC converter, is stabilized to 0.5 V (the MPP: Maximum Power Point).

However, there is a difference in the maximum power point between a situation in which the illumination intensity is 1000 W/cm$^2$ and a situation in which the illumination intensity is 500 W/cm$^2$. Accordingly, in a case in which feedback control is applied to such a DC/DC converter such that the input voltage approaches 0.5 V regardless of the illumination intensity, such a solar battery does not necessarily provide its maximum power.

Furthermore, the current-voltage characteristics of such a solar battery are endowed with temperature dependence. Specifically, the voltage becomes higher at lower temperatures, and the voltage becomes lower at higher temperatures. Accordingly, with the temperature coefficient as −2 mV/° C., the difference in the maximum power point is 50×2 mV/° C.=100 mV, which is a non-negligible value, between 25° C., which is an ordinary temperature, and 75° C., which is a high temperature. Thus, in order to provide the maximum power point over a possible range of temperatures, there is a need to adjust the input voltage of the DC/DC converter according to the temperature. This leads to a problem of a complicated circuit configuration.

Furthermore, with the MPP method, the electric power supplied to such a secondary battery that acts as a load of the DC/DC converter does not necessarily reach its maximum even if the output voltage of the solar battery, i.e., the input voltage of the DC/DC converter is set to its maximum. This is because electric power is consumed by the DC/DC converter itself.

SUMMARY OF THE INVENTION

The present invention has been made in order to solve such a problem. Accordingly, it is an exemplary purpose of an embodiment of the present invention to provide a charging circuit which is capable of charging a secondary battery with high efficiency.

An embodiment of the present invention relates to a charging circuit configured to receive electric power from a solar battery, and to charge a secondary battery. The charging circuit comprises: a DC/DC converter comprising a switching transistor, an inductor element, a rectifier element, and an output capacitor; a charging current detection unit configured to generate a detection signal that corresponds to a charging current supplied from the DC/DC converter to the secondary battery; a control circuit configured to generate a reference voltage that corresponds to the detection signal; and a driving unit configured to generate a pulse signal having a duty ratio that is adjusted such that the voltage output from the solar battery matches the reference voltage, and to perform switching of the switching transistor according to the pulse signal.

With such an embodiment, the charging current, i.e., the electric power to be supplied to the secondary battery, can be controlled, thereby charging the secondary battery with high efficiency.

Also, the control circuit may be configured to adjust the reference voltage such that the charging current becomes greater. Such an arrangement provides an increase in the electric power to be supplied to the secondary battery, thereby providing a reduced charging time.

Also, the charging circuit may be configured to sweep the reference voltage, and to detect the reference voltage at which the charging current reaches its maximum value.

Also, the control circuit may be configured to alternately repeat a search period in which the reference voltage is swept, and a fixed period in which the reference voltage that was detected in the search period as the voltage at which the charging current reaches its maximum value is fixedly output.

Also, the charging current detection unit may comprise a detection resistor arranged between the output capacitor and the secondary battery, and may be configured to output, as the detection signal, a voltage drop that occurs across the detection resistor.

Also, the control circuit may be configured to adjust the reference voltage and the frequency of the pulse signal such that the charging current becomes greater.

By adjusting the frequency of the pulse signal, such an arrangement provides optimization of the efficiency of the DC/DC converter.

Also, the control circuit may be configured to sweep the reference voltage and the frequency of the pulse signal, and to detect the reference voltage and the frequency of the pulse signal at which the charging current reaches its maximum value.

Also, the switching transistor may be configured to have a variable size. Also, the control circuit may be configured to adjust at least the reference voltage and the size of the switching transistor such that the charging current becomes greater.

When the output current of the solar battery is small, a smaller size of the switching transistor leads to higher efficiency of the DC/DC converter. Conversely, when the output current of the solar battery is large, a greater size of the switching transistor leads to higher efficiency of the DC/DC converter. With such an embodiment, the size of the switching transistor can be adjusted such that the charging current becomes greater. Thus, such an arrangement is capable of operating the DC/DC converter with high efficiency.

Also, the control circuit may be configured to sweep at least the reference voltage and the size of the switching transistor, and to detect the reference voltage and the size of the switching transistor at which the charging current reaches its maximum value.

Also, the inductor element may be configured to have a variable inductance value. Also, the control circuit may be configured to adjust at least the reference voltage and the inductance value such that the charging current becomes greater.

By adjusting the inductance value of the inductor element, such an arrangement is capable of operating the DC/DC converter with high efficiency.

Also, the control circuit may comprise: an A/D converter configured to perform analog/digital conversion of the detection signal; a logic unit configured to generate a digital instruction value that corresponds to an output value of the A/D converter; and a D/A converter configured to perform digital/analog conversion of the instruction value so as to generate the reference voltage.

Also, the control circuit may be configured to alternately repeat a search period in which the reference voltage is swept, and a fixed period in which the reference voltage that was detected in the search period as a voltage at which the charging current reaches its maximum value is fixedly output. Also, in the fixed period, the control circuit may stop the operations of the logic unit and the A/D converter.

Such an arrangement provides reduced power consumption of the circuit.

Also, a charging circuit according to an embodiment may further comprise: a first transistor arranged in parallel with the switching transistor; an oscillator configured to output a clock signal having a predetermined frequency; a driver configured to drive the first transistor according to the clock signal; a diode arranged such that its anode is connected to the first transistor; and a second output capacitor connected to a cathode of the diode. Also, a voltage that develops at the second output capacitor may be used as a power supply voltage of the charging circuit.

Such an arrangement allows the entire charging circuit to operate using only the electric power received from the solar battery.

Also, the driver may comprise: a P-channel second transistor, a P-channel third transistor arranged such that the clock signal is input to its gate, and an N-channel fourth transistor arranged such that the clock signal is input to its gate, which are sequentially arranged in series between a output voltage terminal of the solar battery and a ground voltage terminal; a first inverter configured to invert the clock signal, and to output the inverted clock signal to a gate of the second transistor; a first capacitor arranged such that its first terminal is connected to a connection node that connects the second transistor and the third transistor; and a second inverter configured to invert the clock signal, and to output the inverted clock signal to a second terminal of the first capacitor.

With such an arrangement, the amplitude of the clock signal is boosted such that it is doubled, and the clock signal thus boosted is supplied to the gate of the first transistor. Thus, such an arrangement provides the first transistor with reduced on resistance, thereby improving the efficiency of the DC/DC converter.

Also, a charging circuit according to an embodiment may further comprise: a fifth transistor arranged in parallel with the first transistor; and a third inverter configured to receive, via its power supply terminal as an input voltage, a voltage that develops at the second output capacitor, and to perform switching of the fifth transistor according to the clock signal.

With such an arrangement, when the voltage that is double the output voltage of the solar battery is higher than the output voltage of the charging circuit, the boosting operation is performed by performing switching of the first transistor, and when the voltage that is double the output voltage of the solar battery is lower than the output voltage of the charging circuit, the boosting operation is performed by performing switching of the fifth transistor.

Also, a charging circuit according to an embodiment may further comprise a voltage detection unit configured to compare the voltage output from the solar battery with a predetermined threshold voltage. Also, when the voltage output from the solar battery is higher than the threshold voltage, the oscillator may be operated, and when the voltage output from the solar battery is lower than the threshold voltage, the operation of the oscillator may be stopped.

Also, a charging circuit according to an embodiment may further comprise: a first voltage detection unit configured to compare the voltage output from the solar battery with a predetermined first threshold voltage, and to output a set signal that is asserted when the voltage output from the solar battery is higher than the predetermined first threshold voltage; a second voltage detection unit configured to compare the voltage output from the solar battery with a second threshold voltage, and to output a reset signal that is asserted when the voltage output from the solar battery is lower than the second threshold voltage; and an SR latch configured to output an output signal that is changed according to the set signal and the reset signal. Also, the oscillator may be switched between an operating state and a non-operating state according to the output signal of the SR latch.

With such an arrangement, the output voltage of the solar battery can be compared with a threshold voltage having hysteresis.

Also, the voltage detection unit may comprise: a soft enhancement mode P-channel sixth transistor arranged such that its gate is grounded, and a depletion mode P-channel seventh transistor arranged such that its gate is connected to its source, which are sequentially arranged in series between an output voltage terminal of the solar battery and a ground terminal; a depletion mode P-channel eighth transistor arranged such that its gate is connected to its source, and a soft enhancement mode ninth transistor arranged such that its gate is grounded, which are sequentially arranged in series between the output voltage terminal of the solar battery and the ground terminal; and a comparator configured to compare a voltage that develops at a connection node that connects the sixth transistor and the seventh transistor with a voltage that develops at a connection node that connects the eighth transistor and the ninth transistor.

By adjusting the W/L size of each of the sixth transistor through the ninth transistor, such an embodiment enables low-voltage operation. Furthermore, such an arrangement allows the threshold voltage to have the same temperature dependence as the temperature dependence of the open voltage of the solar battery.

Also, the oscillator may comprise: a resistor and a tenth transistor sequentially arranged in series between an output voltage terminal of the solar battery and a ground terminal; a second capacitor arranged in parallel with the tenth transistor; and multiple inverters arranged in series between a connection node that connects the resistor and the second capacitor and a control terminal of the tenth transistor.

Such an oscillator is capable of oscillating in a sure manner even if the output voltage of the solar battery is low.

Another embodiment of the present invention relates to an electronic device. The electronic device comprises: a solar battery; a secondary battery; and a charging circuit according to any one of the aforementioned embodiments, configured to receive a voltage output from the solar battery, and to charge the secondary battery.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8B is a diagram which shows the operation of the circuit shown in FIG. 8A.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

In the present specification, the symbols that denote voltage signals, current signals, and resistors, also represent the respective voltage values, current values, and resistance values, as necessary.

Figure 1:
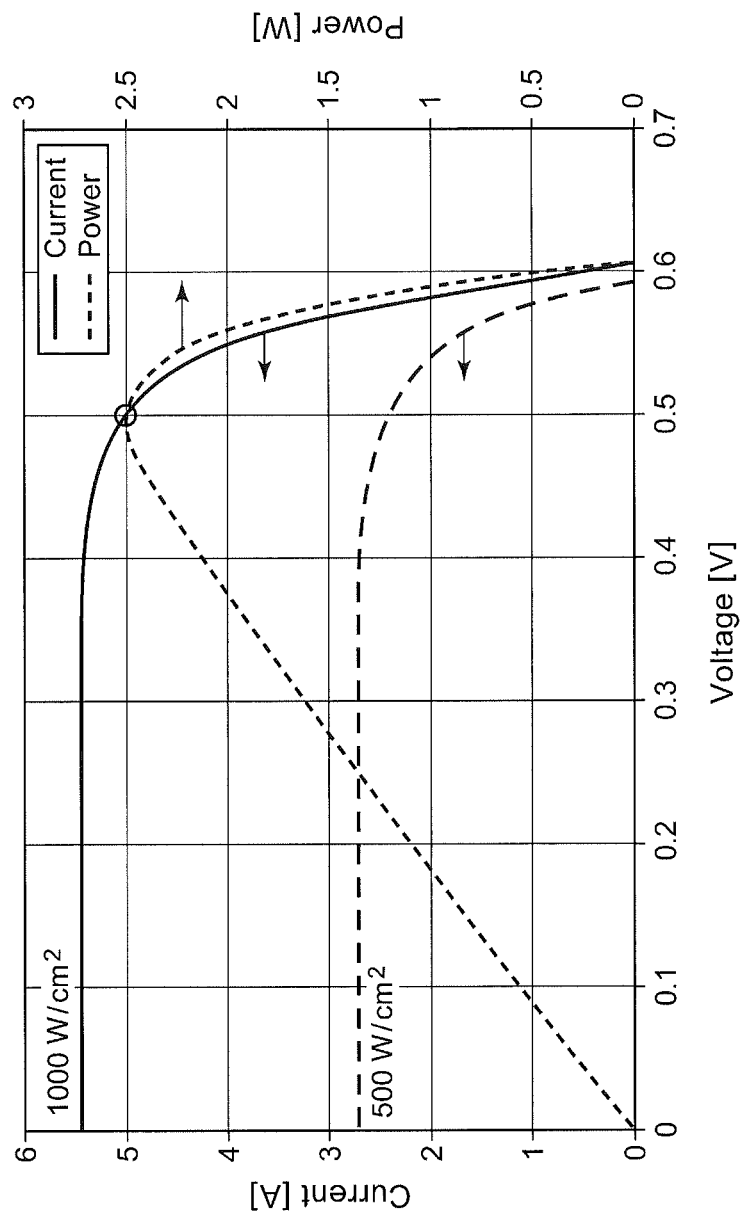
FIG. 1 is a graph showing the current-voltage (I-V) characteristics of a single-cell solar batter.
Figure 2:
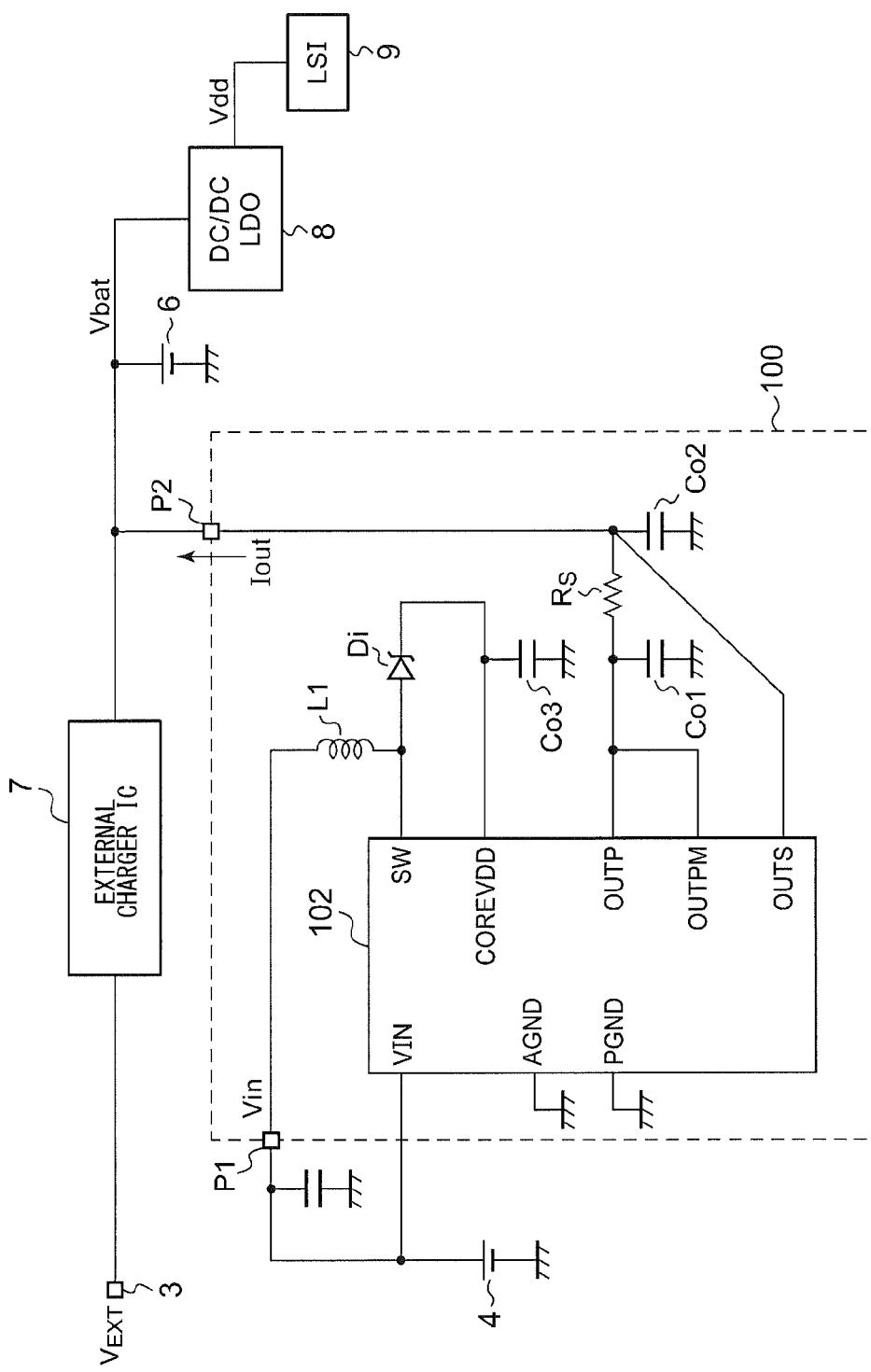
FIG. 2 is a block diagram which shows a configuration of an electronic device including a charging circuit according to an embodiment.

FIG. 2 is a block diagram which shows a configuration of an electronic device 2 including a charging circuit 100 according to an embodiment. The electronic device 2 is configured as a battery-driven information terminal device such as a cellular phone terminal, a PDA, a laptop PC, or the like, for example. The electronic device 2 includes a solar battery 4, a secondary battery 6, a power supply circuit 8, an LSI 9, an external charger IC 7, and a charging circuit 100.

The secondary battery 6 is a lithium-ion battery, a nickel hydride battery, or the like, and is configured to output a battery voltage Vbat. The LSI 9 includes memory, a CPU, an analog LSI, and so forth. The power supply circuit 8 boosts or steps down the battery voltage Vbat so as to supply a power supply voltage Vdd to the LSI 9.

The electronic device 2 includes an adapter terminal 3 via which an external power supply (not shown) such as an AC adapter, a USB (Universal Serial Bus), or the like, can be detachably connected, which allows a voltage (which will be referred to as the "external voltage" hereafter) $V_{EXT}$ to be received from an external power supply. The external charger IC 7 charges the secondary battery 6 using the external voltage $V_{EXT}$. The external charger IC 7 may be configured as a linear-regulator charger circuit, or may be configured as a switching regulator (DC/DC converter) charger circuit.

The solar battery 4 generates a voltage (which will also be referred to as the "input voltage") Vin that corresponds to the amount of light received. In a case in which the solar battery 4 has a single-cell structure, the solar battery 4 outputs an input voltage Vin on the order of 0.3 V to 0.8 V. In a case in which the solar battery 4 has a two-cell structure, the solar battery 4 outputs an input voltage Vin on the order of 0.6 V to 1.6 V. The charging circuit 100 receives electric power from the solar battery 4 so as to charge the secondary battery 6. Description will be made below regarding a configuration of the charging circuit 100 according to the embodiment.

Figure 3:
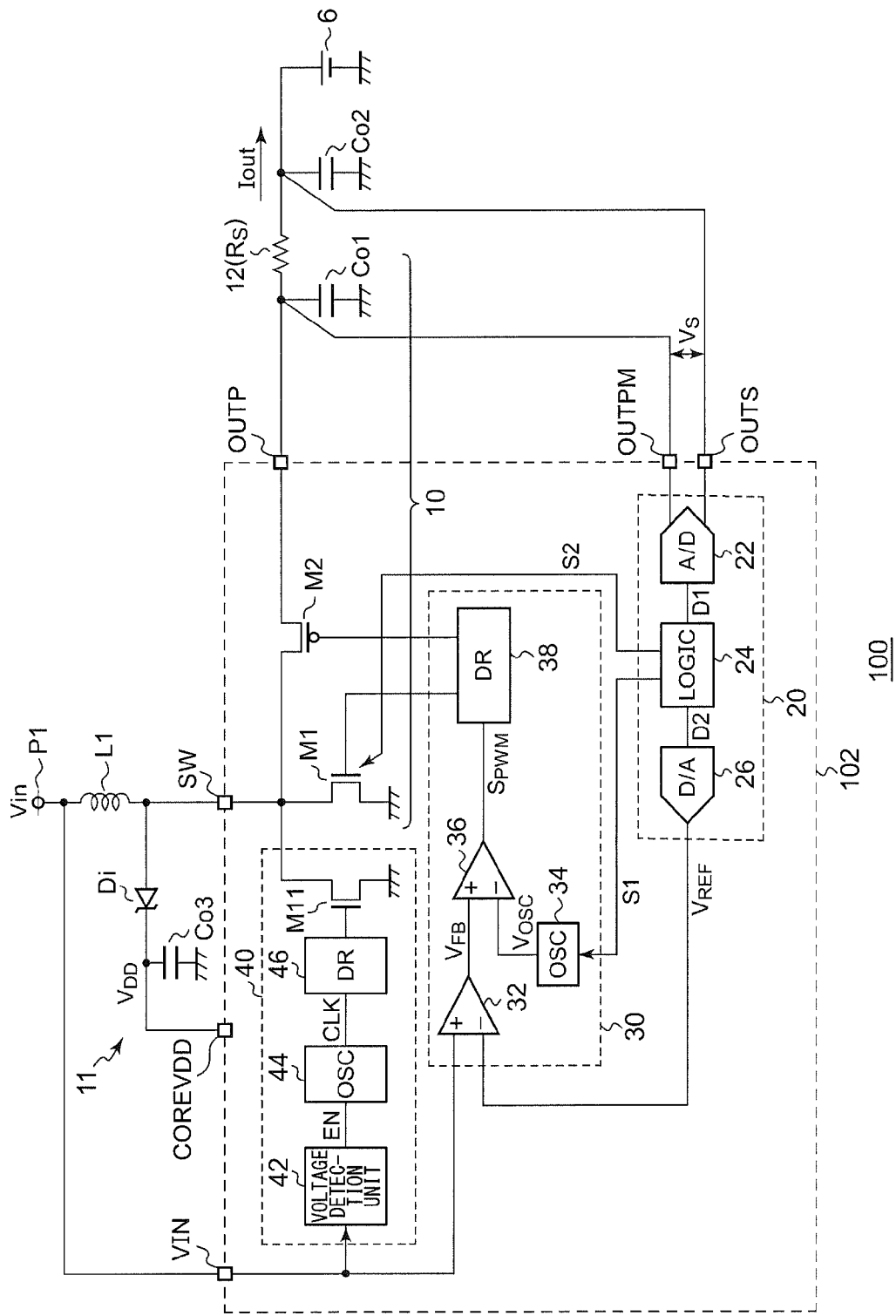
FIG. 3 is a circuit diagram which shows a configuration of a charging circuit according to the embodiment.

FIG. 3 is a circuit diagram which shows a configuration of the charging circuit 100 according to the embodiment. The charging circuit 100 boosts the output voltage of the solar battery 4, which has been input to an input terminal P1, and supplies a charging current Iout to the secondary battery 6 connected to an output terminal P2.

The charging circuit 100 includes a DC/DC converter 10, a charging current detection unit 12, a control circuit 20, and a driving unit 30.

The DC/DC converter 10 includes a switching transistor M1, an inductor element L1, a synchronous rectifier transistor M2, and output capacitors Co1 and Co2. The DC/DC converter 10 has a typical topology, and accordingly, description thereof will be omitted.

The charging current detection unit 12 generates a detection signal Vs that corresponds to the charging current Iout supplied from the DC/DC converter 10 to the secondary battery 6. For example, the charging current detection unit 12 includes a detection resistor Rs arranged on a path of the charging current Iout. A voltage drop which is proportional to the charging current Iout occurs across the detection resistor Rs. The charging current detection unit 12 outputs, as a detection voltage Vs, the voltage drop that occurs across the detection resistor Rs.

The control circuit 20 generates a reference voltage $V_{REF}$ that corresponds to the detection signal Vs. The control circuit 20 adjusts the reference voltage $V_{REF}$ such that the charging current Iout becomes larger. The control circuit 20 sweeps the reference voltage $V_{REF}$, and detects a reference voltage $V_{REFMAX}$ at which the charging current Iout reaches its maximum value i.e., at which the detection voltage Vs reaches its maximum. Specifically, the control circuit 20 alternately repeats a search period τ1 and a fixed period τ2 in a time sharing manner. In the search period τ1, the control circuit 20 sweeps the reference voltage $V_{REF}$, performs sampling of the detection voltage Vs for each respective cycle of the reference voltage $V_{REF}$, and detects the reference voltage $V_{REFMAX}$ at which the charging current Iout reaches its maximum value. In the following fixed period τ2, the control circuit 20 fixedly outputs the reference voltage $V_{REFMAX}$.

The control circuit 20 includes an A/D converter 22, a logic unit 24, and a D/A converter 26. The A/D converter 22 converts the detection voltage Vs into a digital value D1. The logic unit 24 generates a digital instruction value D2 that corresponds to the output value D1 of the A/D converter 22. The D/A converter 26 performs digital/analog conversion of the instruction value D2 so as to generate the reference voltage $V_{REF}$.

In the search period τ1, the control circuit 20 sweeps the instruction value D2. Next, the control circuit 20 performs sampling of the digital value D1 that represents the charging current Iout, and holds the instruction value D2 at which the charging current Iout reaches its maximum value. In the following fixed period τ2, the control circuit 20 fixedly outputs the instruction value D2 thus held.

The driving unit 30 generates a pulse signal $S_{PWM}$ having a duty ratio that is adjusted such that the voltage Vin output from the solar battery 4 matches the reference voltage $V_{REF}$, and performs complementary switching of the switching transistor M1 and the synchronous rectifier transistor M2 according to the pulse signal $S_{PWM}$.

Specifically, the driving unit 30 is configured as a pulse width modulator, and includes an error amplifier 32, an oscillator 34, a comparator 36, and a driver 38. The error amplifier 32 amplifies the difference between the voltage Vin output from the solar battery 4 and the reference voltage $V_{REF}$, and outputs the feedback voltage $V_{FB}$. The oscillator 34 outputs a cyclic signal $V_{OSC}$ having a triangle waveform or a sawtooth waveform. The comparator 36 compares the feedback voltage $V_{FB}$ with the cyclic signal $V_{OSC}$, and generates a pulse signal $S_{PWM}$.

It should be noted that the configuration of the driving unit 30 is not restricted to such a configuration shown in FIG. 3.

Also, other configurations may be employed. Also, the driving unit 30 may be configured as a pulse frequency modulator, instead of such a pulse width modulator.

By performing switching of the switching transistor M1 and the synchronous rectifier transistor M2, such an arrangement provides the charging current Iout to the secondary battery 6. Furthermore, the inductor element L1, the switching transistor M1, a diode Di, and an output capacitor Co3 form a second DC/DC converter 11. The output voltage $V_{DD}$ of the second DC/DC converter 11 is used as a power supply for the control IC 102.

Figure 4A:
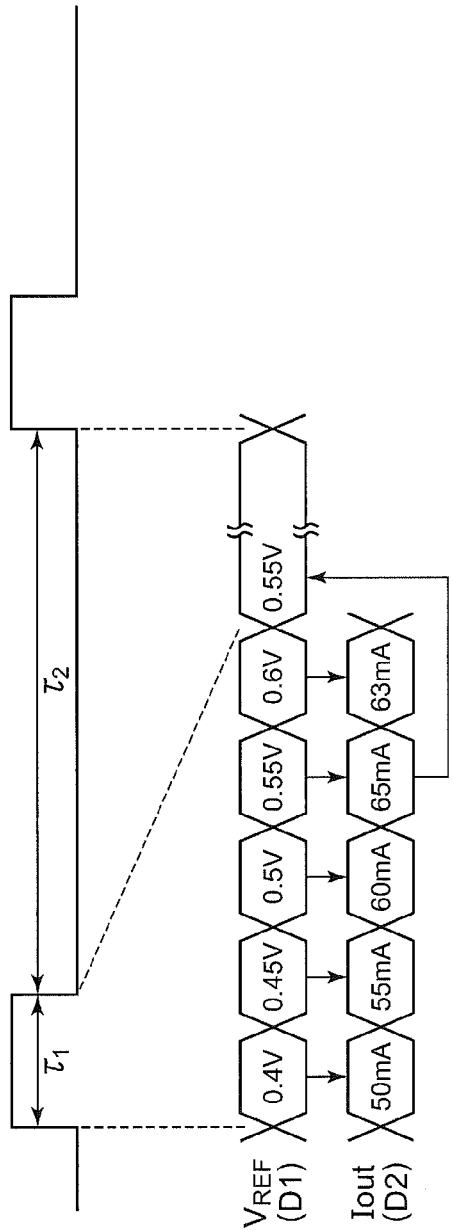
FIGS. 4A and 4B are time charts each showing the operation of the charging circuit shown in FIG. 3.

The above is the basic configuration of the charging circuit 100. Next, description will be made regarding the operation thereof. FIG. 4A is a time chart which shows the operation of the charging circuit 100 shown in FIG. 3.

During the search period τ1, sampling is performed of the digital value D1 which indicates the output current Iout for each respective instruction value while the instruction value D1 is swept. Next, such an arrangement selects the digital value D1 (0.55 V) at which the output current Iout reaches its maximum value (65 mA). In the following fixed period τ2, the digital value D1 thus selected is output. During the fixed period τ2, the operations of the logic unit 24 and the A/D converter 22 are stopped. This provides a reduction in power consumption.

The above is the basic operation of the charging circuit 100. With the charging circuit 100, such an arrangement is capable of adjusting the charging current Iout according to the situation, such that it approaches its maximum value even if there is a change in the temperature or the load, i.e., the voltage Vbat of the secondary battery 6. Thus, such an arrangement allows the secondary battery 6 to be charged with high efficiency.

Returning to FIG. 3, in order to provide further improved efficiency, the charging circuit 100 includes the following features.

(1) Optimization of the Frequency of the Pulse Signal $S_{PWM}$

The control circuit 20 adjusts the frequency of the pulse signal $S_{PWM}$, in addition to the reference voltage $V_{REF}$. The frequency of the pulse signal $S_{PWM}$ can be changed by switching the oscillation frequency of the oscillator 34. The control circuit 20 sweeps the pair of the reference voltage $V_{REF}$ and the frequency fosc of the pulse signal $S_{PWM}$, and detects the pair of the reference voltage $V_{REF}$ and the frequency fosc of the pulse signal $S_{PWM}$ at which the charging current Iout reaches its maximum value. The control circuit 20 switches the oscillation frequency of the oscillator 34 according to the control signal S1.

(2) Optimization of the Size of the Switching Transistor M1

The switching transistor M1 is configured such that its transistor size (W/L) is switchable between at least two values. The control circuit 20 adjusts at least the reference voltage $V_{REF}$ and the size of the switching transistor M1 such that the charging current Iout becomes larger. The control circuit 20 switches the size of the switching transistor M1 according to the control signal S2.

(3) Optimization of the Inductance Value of the Inductor Element L1

The inductor element L1 is configured to have a variable inductance value. For example, by arranging multiple inductor elements in parallel, and by switching the inductor element by means of a switch, such an arrangement may be configured to be capable of switching the inductance value.

The control circuit 20 adjusts at least the reference voltage $V_{REF}$ and the inductance value such that the charging current Iout becomes larger.

Figure 4B:
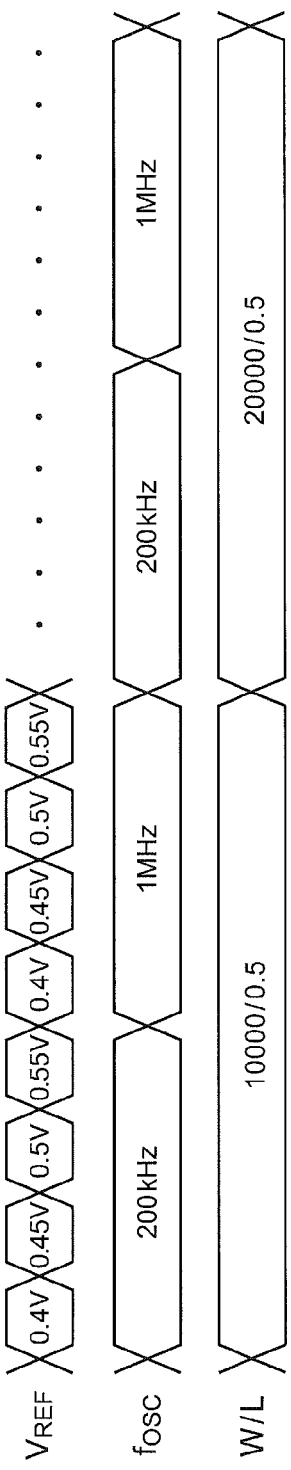

FIG. 4B is a time chart showing an example of optimization of the reference voltage $V_{REF}$, the frequency fosc, and the transistor size W/L. FIG. 4B shows an operation for searching for the maximum value of the charging current Iout while changing all the parameters in a round-robin manner.

It should be noted that, in a case in which fluctuation of the input voltage Vin occurs in a short period of time, the search period τ1 that can be set becomes limited. In order to solve such a problem, in a case in which the search for the maximum value of the charging current Iout is carried out while changing the multiple parameters, the optimized value may be searched for according to another algorithm, instead of changing the parameters in a round-robin manner as shown in FIG. 4B.

By switching the oscillation frequency, the transistor size, or the inductance value, such an arrangement is capable of optimizing the efficiency of the DC/DC converter according to the electrical state of the solar battery 4 or the electrical state of the secondary battery 6.

Figure 5:
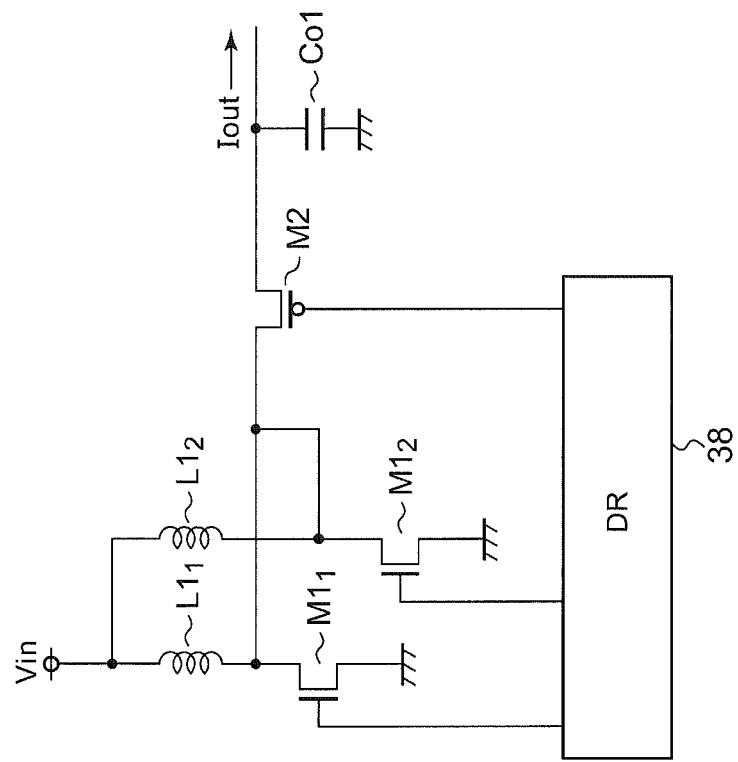
FIG. 5 is a circuit diagram which shows a modification of the topology of a DC/DC converter.

FIG. 5 is a circuit diagram which shows an example of a modified topology of the DC/DC converter 10. The configuration shown in FIG. 5 can be effectively applied to an arrangement configured to be capable of changing both the inductance value of the inductor element L1 and the size of the switching transistor M1. The DC/DC converter 10 includes two pairs of an inductor element L1 and a switching transistor M1, i.e., a pair of an inductor element $L1_1$ and a switching transistor $M1_1$ and a pair of an inductor element $L1_2$ and a switching transistor $M1_2$. There is a difference in inductance value between the inductor elements $L1_1$ and $L1_2$. Furthermore, there is a difference in size between the switching transistors $M1_1$ and $M1_2$. The driver 38 is configured to be capable of selecting a desired pair of an inductor element L1 and a switching transistor M1 to be driven.

Returning to FIG. 3, the charging circuit 100 further includes a start-up circuit 40. When the input voltage Vin is insufficient, an operational amplifier, a comparator, or the control circuit 20 included in the driving unit 30 would not be able to operate. In order to solve such a problem, in the start-up operation, such an arrangement operates the start-up circuit 40 so as to instruct the second DC/DC converter 11 to boost the input voltage Vin, thereby generating the power supply voltage $V_{DD}$. After a sufficiently high power supply voltage $V_{DD}$ is generated, the driving unit 30 and the control circuit 20 each start up.

The start-up circuit 40 includes a first transistor M11, a voltage detection unit 42, an oscillator 44, and a driver 46. The voltage detection unit 42, the oscillator 44, and the driver 46, are each configured to operate using the input voltage Vin as a power supply voltage.

The voltage detection unit 42 compares the input voltage Vin with a threshold voltage $V_{TH}$. When Vin>$V_{TH}$, the voltage detection unit 42 turns on the oscillator 44. The oscillator 44 is configured to oscillate at a predetermined frequency so as to generate a clock signal CLK. The driver 46 performs switching of the first transistor M11 according to the clock signal CLK.

Figure 6:
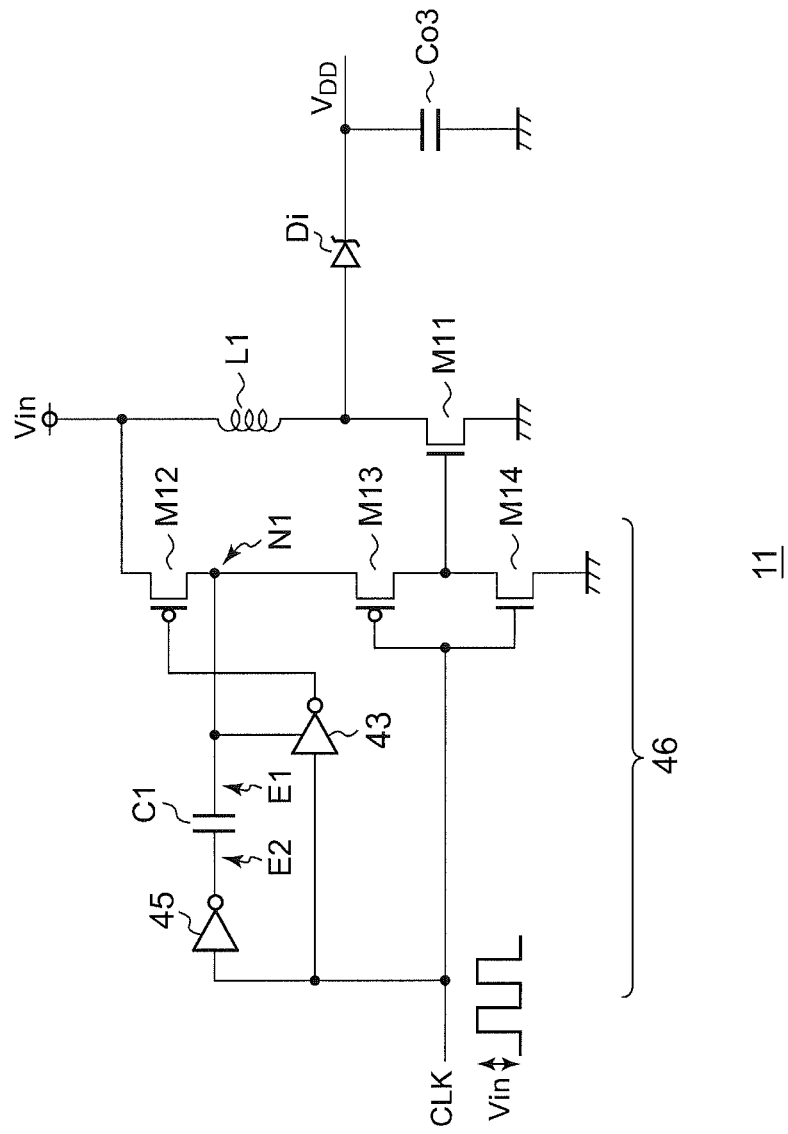
FIG. 6 is a circuit diagram which shows a configuration of a driver.

FIG. 6 is a circuit diagram which shows a configuration of the driver 46. The driver 46 includes a second transistor M12 through a fourth transistor M14, a first inverter 43, a second inverter 45, and a first capacitor C1.

The second transistor M12 through the fourth transistor M14 are sequentially arranged in series between the input voltage terminal Vin and the ground terminal. The second transistor M12 and the third transistor M13 are each configured as a P-channel MOSFET, and the fourth transistor M14 is configured as an N-channel MOSFET. The clock signal CLK is input to the respective gates of the second transistor M12 through the fourth transistor M14.

The first inverter 43 inverts the clock signal CLK, and outputs the inverted clock signal to the gate of the second transistor M12. The first capacitor C1 is arranged such that the first terminal E1 thereof is connected to a connection node N1 that connects the second transistor M12 and the third transistor M13. The second inverter 45 inverts the clock signal CLK, and outputs the inverted clock signal to the second terminal E2 of the first capacitor C1.

When the clock signal CLK is high level, the low-level signal is applied to the gate of the second transistor M12. In this state, the second transistor M12 is turned on, and accordingly, the input voltage Vin is applied to the first terminal E1 of the first capacitor C1. Furthermore, in this state, the output of the second inverter 45 is set to low level, and accordingly, the ground voltage is applied to the second terminal E2 of the first capacitor C1. That is to say, the first capacitor C1 is charged with the input voltage Vin.

Next, when the clock signal CLK is switched to low level, the input voltage Vin is applied to the second terminal E2 of the first capacitor C1. In this stage, the voltage 2×Vin, which is double the input voltage Vin, develops at the first terminal E1 of the first capacitor C1.

That is to say, the first inverter 43, the second inverter 45, the second transistor M12, and the first capacitor C1 collectively function as a charge pump circuit. The third transistor M13 and the fourth transistor M14 together form an inverter, and this inverter operates such that, when the clock signal CLK is high level, the ground voltage 0 V is applied to the gate of the first transistor $M11_1$ so as to turn off the first transistor M11. When the clock signal CLK is low level, the boosted voltage, i.e., 2×Vin, is applied to the gate of the first transistor M11, so as to turn on the first transistor M11.

By performing switching of the first transistor M11, the input voltage Vin is boosted, thereby generating the power supply voltage $V_{DD}$. If a charge pump circuit is not provided, the input voltage Vin applied to the gate of the first transistor M11 is only on the order of 0.3 to 0.5 V. In this case, the on resistance of the first transistor M11 is very high. In contrast, by providing such a charge pump circuit configured to apply the boosted input voltage 2Vin to the gate of the first transistor M11, such an arrangement provides a reduced on resistance of the first transistor M11, thereby improving the efficiency of the second DC/DC converter 11.

Figure 7:
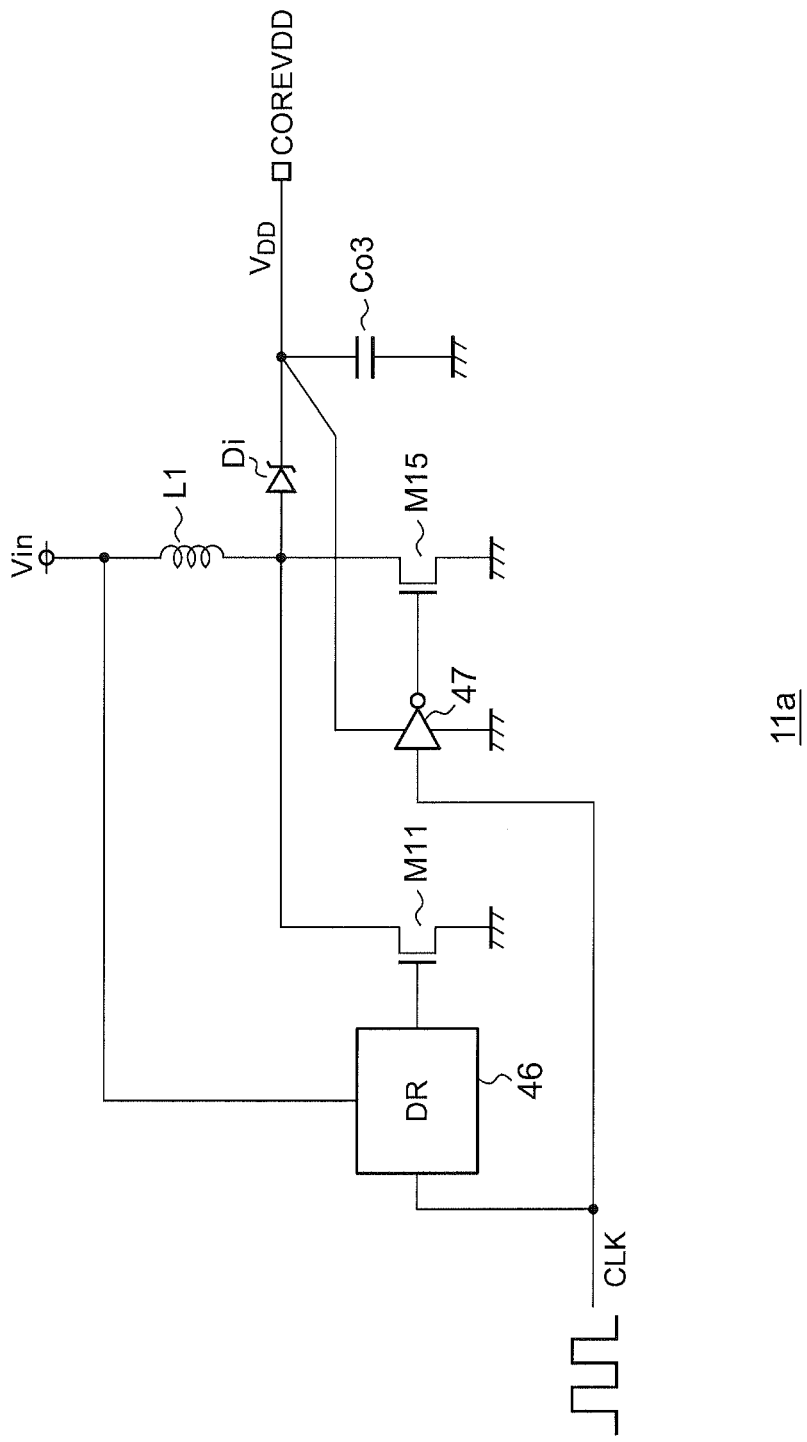
FIG. 7 is a circuit diagram which shows a modification of a second DC/DC converter shown in FIG. 6.

FIG. 7 is a circuit diagram which shows a modification of the second DC/DC converter shown in FIG. 6. A second DC/DC converter 11a shown in FIG. 7 further includes a fifth transistor M15 and a third inverter 47, in addition to the configuration shown in FIG. 6.

The fifth transistor M15 is arranged in parallel with the first transistor M11. The output voltage $V_{DD}$ of the second DC/DC converter 11a is applied to the power supply terminal of the third inverter 47. With such a configuration, the boosted voltage 2Vin is applied to the gate of the first transistor M11. Furthermore, the power supply voltage $V_{DD}$ is applied to the gate of the fifth transistor M15.

Immediately after the second DC/DC converter 11a starts to operate, 2Vin is greater than $V_{DD}$, and accordingly, the on resistance of the first transistor M11 is low and the boosting operation is performed mainly by the first transistor M11. After a certain period of time elapses in the boosting operation, the power supply voltage $V_{DD}$ becomes greater than the boosted voltage 2Vin and the boosting operation is performed mainly by the fifth transistor M15.

That is to say, such a second DC/DC converter 11a shown in FIG. 7 provides such reduced combined resistance of the first transistor M1₁ and the fifth transistor M15, thereby providing further improved efficiency.

Figure 8A:
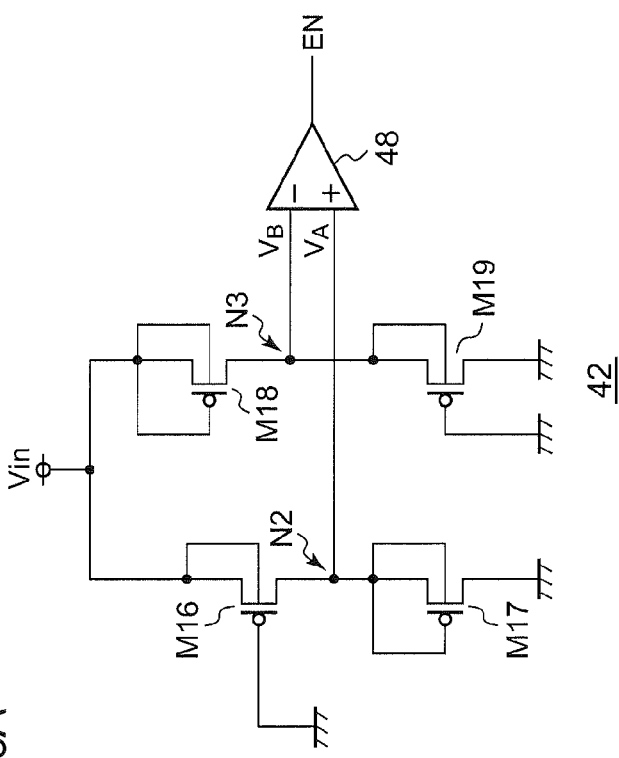
FIGS. 8A and 8B are circuit diagrams each showing a configuration of a voltage detection unit shown in FIG. 3.
Figure 8B:
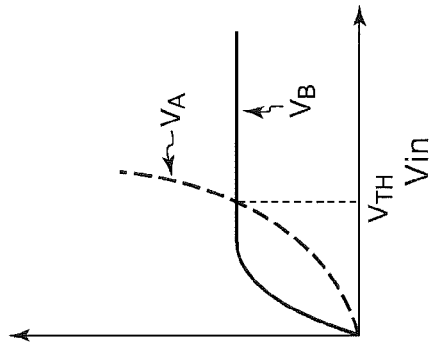
Figure 8C:
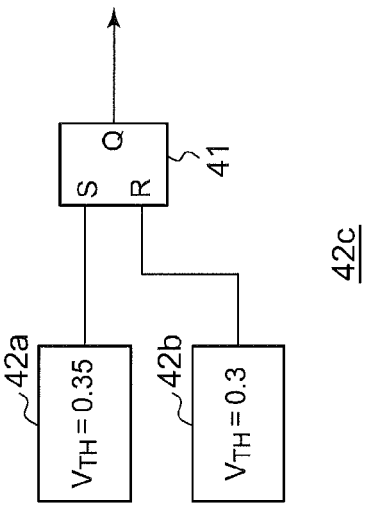

FIGS. 8A and 8C are circuit diagrams each showing a configuration of the voltage detection unit 42 shown in FIG. 3. FIG. 8B is a diagram which shows the operation of the circuit shown in FIG. 8A. The voltage detection unit 42 includes a sixth transistor M16 through ninth transistor M19, and a comparator 48.

The sixth transistor M16 and the seventh transistor M17 are sequentially arranged in series between the input voltage terminal Vin and the ground voltage terminal. The sixth transistor M16 is configured as a soft enhancement mode P-channel MOSFET, and is arranged such that the gate thereof is grounded. The seventh transistor M17 is configured as a depletion mode P-channel MOSFET, and is arranged such that its gate and source are connected to each other.

The eighth transistor M18 and the ninth transistor M19 are sequentially connected in series between the input voltage terminal Vin and the ground terminal. The eighth transistor M18 is depletion mode P-channel MOSFET, and is arranged such that the gate and the source thereof are connected to each other. The ninth transistor M19 is configured as a soft enhancement mode P-channel MOSFET, and is arranged such that the gate thereof is grounded.

A voltage $V_A$ develops at a connection node N2 that connects the sixth transistor M16 and the seventh transistor M17. Furthermore, a voltage $V_B$ develops at a connection N3 that connects the eighth transistor M18 and the ninth transistor M19. The comparator 48 makes a comparison between the voltages $V_A$ and $V_B$. That is to say, the point where the voltages $V_A$ and $V_B$ cross is used as the threshold voltage $V_{TH}$.

The voltage detection unit 42 has the following advantages.

First, such an arrangement provides a reduction in the effects of irregularities in the threshold voltage $V_{TH}$, as compared with an arrangement in which voltage dividing resistors are employed instead of the sixth transistor M16 and the seventh transistor M17. Thus, such an arrangement is operable at a low voltage.

Furthermore, by optimizing the size W/L of each transistor, such an arrangement provides a threshold voltage $V_{TH}$ having temperature characteristics that conform to the temperature characteristics of the voltage Vin output from the solar battery 4.

The voltage detection unit 42 is preferably provided with hysteresis. FIG. 8C shows a configuration of a voltage detection unit 42c provided with hysteresis. The voltage detection unit 42 includes two voltage detection units 42a and 42b, and an SR latch 41.

The voltage detection units 42a and 42b are each configured in a same manner. The threshold voltage $V_{TH}$ to be provided by the voltage detection unit 42a is set to 0.35 V, and the threshold voltage $V_{TH}$ to be provided by the voltage detection unit 42b is set to 0.3 V. The outputs of the voltage detection units 42a and 42b are respectively input to the set terminal and the reset terminal of the SR latch 41.

With such a voltage detection unit 42c, when the input voltage Vin reaches 0.35 V, the oscillator 44 is turned on, and when the input voltage Vin falls to 0.3 V, the oscillator 44 is turned off.

Figure 9:
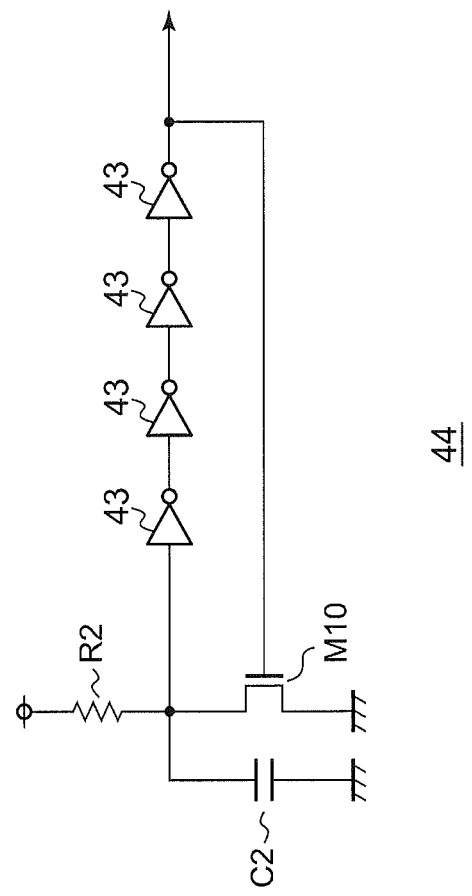
FIG. 9 is a circuit diagram which shows a configuration of an oscillator shown in FIG. 3.

FIG. 9 is a circuit diagram which shows a configuration of the oscillator 44 shown in FIG. 3. The oscillator 44 is configured employing a MOSFET having a low threshold voltage Vth. The oscillator 44 includes a tenth transistor M10, a resistor R2, and a second capacitor C2. The resistor R2 and the tenth transistor M10 are sequentially arranged in series between the input voltage terminal Vin and the ground voltage terminal. The second capacitor C2 is arranged in parallel with the tenth transistor M10. Multiple inverters 43 are connected in series, and are arranged such that the electric potential at a connection node N4 that connects the resistor R2 and the second capacitor C2 is received, and such that output signal of the multiple inverters 43 is output to the gate of the tenth transistor M10.

The oscillator 44 shown in FIG. 9 is capable of oscillating in a sure manner even if the input voltage Vin is low.

While the preferred embodiments of the present invention have been described using specific terms, such description is for illustrative purposes only, and it is to be understood that changes and variations may be made without departing from the spirit or scope of the appended claims.

What is claimed is:

1. A charging circuit configured to receive electric power from a solar battery, and to charge a secondary battery, the charging circuit comprising:
   a DC/DC converter comprising a switching transistor, an inductor element, a rectifier element, and an output capacitor;
   a charging current detection unit configured to generate a detection signal that corresponds to a charging current supplied from the DC/DC converter to the secondary battery;
   a control circuit configured to generate a reference voltage that corresponds to the detection signal; and
   a driving unit configured to generate a pulse signal having a duty ratio that is adjusted such that the voltage output from the solar battery matches the reference voltage, and to perform switching of the switching transistor according to the pulse signal,
   wherein the control circuit is configured to alternately repeat a search period in which the reference voltage is swept, and a fixed period in which the reference voltage that was detected in the search period as the voltage at which the charging current reaches its maximum value is fixedly output.

2. A charging circuit according to claim 1, wherein the control circuit is configured to adjust the reference voltage such that the charging current becomes greater.

3. A charging circuit according to claim 2, wherein the charging circuit is configured to sweep the reference voltage, and to detect the reference voltage at which the charging current reaches its maximum value.

4. A charging circuit according to claim 1, wherein the charging current detection unit comprises a detection resistor arranged between the output capacitor and the secondary battery, and is configured to output, as the detection signal, a voltage drop that occurs across the detection resistor.

5. A charging circuit according to claim 1, wherein the control circuit is configured to adjust the reference voltage and the frequency of the pulse signal such that the charging current becomes greater.

6. A charging circuit according to claim 5, wherein the control circuit is configured to sweep the reference voltage and the frequency of the pulse signal, and to detect the reference voltage and the frequency of the pulse signal at which the charging current reaches its maximum value.

7. A charging circuit according to claim 1, wherein the switching transistor is configured to have a variable size, and wherein the control circuit is configured to adjust at least the reference voltage and the size of the switching transistor such that the charging current becomes greater.

8. A charging circuit according to claim 7, wherein the control circuit is configured to sweep at least the reference voltage and the size of the switching transistor, and to detect the reference voltage and the size of the switching transistor at which the charging current reaches its maximum value.

9. A charging circuit according to claim 1, wherein the inductor element is configured to have a variable inductance value,
and wherein the control circuit is configured to adjust at least the reference voltage and the inductance value such that the charging current becomes greater.

10. A charging circuit configured to receive electric power from a solar battery, and to charge a secondary battery, the charging circuit comprising:
    a DC/DC converter comprising a switching transistor, an inductor element, a rectifier element, and an output capacitor;
    a charging current detection unit configured to generate a detection signal that corresponds to a charging current supplied from the DC/DC converter to the secondary battery;
    a control circuit configured to generate a reference voltage that corresponds to the detection signal; and
    a driving unit configured to generate a pulse signal having a duty ratio that is adjusted such that the voltage output from the solar battery matches the reference voltage, and to perform switching of the switching transistor according to the pulse signal A charging circuit according to claim 1, wherein the control circuit comprises:
    an A/D converter configured to perform analog/digital conversion of the detection signal;
    a logic unit configured to generate a digital instruction value that corresponds to an output value of the A/D converter; and
    a D/A converter configured to perform digital/analog conversion of the instruction value so as to generate the reference voltage, wherein the control circuit is configured to alternately repeat a search period in which the reference voltage is swept, and a fixed period in which the reference voltage that was detected in the search period as a voltage at which the charging current reaches its maximum value is fixedly output,
    and wherein, in the fixed period, the control circuit stops the operations of the logic unit and the A/D converter.

11. A charging circuit configured to receive electric power from a solar battery, and to charge a secondary battery, the charging circuit comprising:
    a DC/DC converter comprising a switching transistor, an inductor element, a rectifier element, and an output capacitor;
    a charging current detection unit configured to generate a detection signal that corresponds to a charging current supplied from the DC/DC converter to the secondary battery;
    a control circuit configured to generate a reference voltage that corresponds to the detection signal;
    a driving unit configured to generate a pulse signal having a duty ratio that is adjusted such that the voltage output from the solar battery matches the reference voltage, and to perform switching of the switching transistor according to the pulse signal;
    a first transistor arranged in parallel with the switching transistor;
    an oscillator configured to output a clock signal having a predetermined frequency;
    a driver configured to drive the first transistor according to the clock signal;
    a diode arranged such that its anode is connected to the first transistor; and
    a second output capacitor connected to a cathode of the diode,
    wherein a voltage that develops at the second output capacitor is used as a power supply voltage of the charging circuit.

12. A charging circuit according to claim 11, wherein the driver comprises:
    a P-channel second transistor, a P-channel third transistor arranged such that the clock signal is input to its gate, and an N-channel fourth transistor arranged such that the clock signal is input to its gate, which are sequentially arranged in series between a voltage terminal of the solar battery and a ground voltage terminal;
    a first inverter configured to invert the clock signal, and to output the inverted clock signal to a gate of the second transistor;
    a first capacitor arranged such that its first terminal is connected to a connection node that connects the second transistor and the third transistor; and
    a second inverter configured to invert the clock signal, and to output the inverted clock signal to a second terminal of the first capacitor.

13. A charging circuit according to claim 11, further comprising:
    a fifth transistor arranged in parallel with the first transistor; and
    a third inverter configured to receive, via its power supply terminal as an input voltage, a voltage that develops at the second output capacitor, and to perform switching of the fifth transistor according to the clock signal.

14. A charging circuit according to claim 11, further comprising a voltage detection unit configured to compare the voltage output from the solar battery with a predetermined threshold voltage,
    wherein, when the voltage output from the solar battery is higher than the threshold voltage, the oscillator is operated, and when the voltage output from the solar battery is lower than the threshold voltage, the operation of the oscillator is stopped.

15. A charging circuit according to claim 14, wherein the voltage detection unit comprises:
    a soft enhancement mode P-channel sixth transistor arranged such that its gate is grounded, and a depletion mode P-channel seventh transistor arranged such that its gate is connected to its source, which are sequentially arranged in series between an output voltage terminal of the solar battery and a ground terminal;
    a depletion mode P-channel eighth transistor arranged such that its gate is connected to its source, and a soft enhancement mode ninth transistor arranged such that its gate is grounded, which are sequentially arranged in series between the output voltage terminal of the solar battery and the ground terminal; and
    a comparator configured to compare a voltage that develops at a connection node that connects the sixth transistor and the seventh transistor with a voltage that develops at a connection node that connects the eighth transistor and the ninth transistor.

16. A charging circuit according to claim 11, further comprising:
- a first voltage detection unit configured to compare the voltage output from the solar battery with a predetermined first threshold voltage, and to output a set signal that is asserted when the voltage output from the solar battery is higher than the predetermined first threshold voltage;
- a second voltage detection unit configured to compare the voltage output from the solar battery with a second threshold voltage, and to output a reset signal that is asserted when the voltage output from the solar battery is lower than the second threshold voltage; and
- an SR latch configured to output an output signal that is changed according to the set signal and the reset signal,
- wherein the oscillator is switched between an operating state and a non-operating state according to the output signal of the SR latch.

17. A charging circuit according to claim 11, wherein the oscillator comprises:
- a resistor and a tenth transistor sequentially arranged in series between an output voltage terminal of the solar battery and a ground terminal;
- a second capacitor arranged in parallel with the tenth transistor; and
- multiple inverters arranged in series between a connection node that connects the resistor and the second capacitor and a control terminal of the tenth transistor.

18. An electronic device comprising:
- a solar battery;
- a secondary battery; and
- a charging circuit configured to receive a voltage output from the solar battery, and to charge the secondary battery,
- wherein the charging circuit comprises:
  - a DC/DC converter comprising a switching transistor, an inductor element, a rectifier element, and an output capacitor;
  - a charging current detection unit configured to generate a detection signal that corresponds to a charging current supplied from the DC/DC converter to the secondary battery;
  - a control circuit configured to generate a reference voltage that corresponds to the detection signal; and
- a driving unit configured to generate a pulse signal having a duty ratio that is adjusted such that the voltage output from the solar battery matches the reference voltage, and to perform switching of the switching transistor according to the pulse signal, wherein the control circuit is configured to alternately repeat a search period in which the reference voltage is swept, and a fixed period in which the reference voltage that was detected in the search period as the voltage at which the
  - charging current reaches its maximum value is fixedly output.

* * * * *